UNITED STATES PATENT OFFICE.

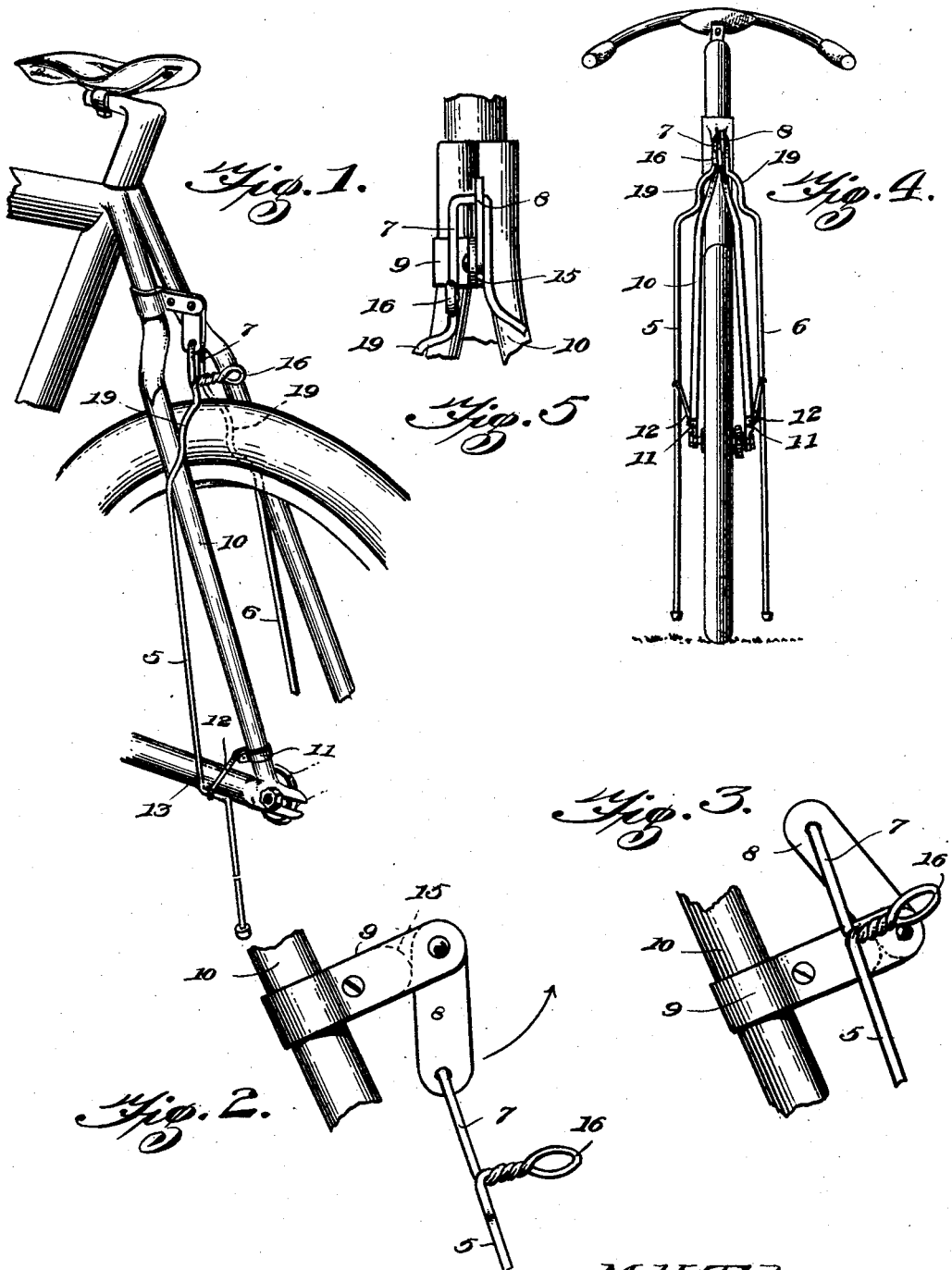

MELVIN H. TYLER, OF MUNCIE, INDIANA.

BICYCLE-SUPPORT.

SPECIFICATION forming part of Letters Patent No. 696,152, dated March 25, 1902.

Application filed August 16, 1901. Serial No. 72,261. (No model.)

*To all whom it may concern:*

Be it known that I, MELVIN H. TYLER, a citizen of the United States, residing at Muncie, in the county of Delaware and State of Indiana, have invented a new and useful Bicycle-Support, of which the following is a specification.

This invention relates to bicycle-supports; and it has for its object to provide a device of this nature that may be carried by the bicycle for movement into operative position at any time and which may be moved into and out of operative position without requiring the rider to leave the bicycle.

Other objects and advantages of the invention will be evident from the following description.

In the drawings forming a portion of this specification and in which like numerals of reference indicate similar parts in the several views, Figure 1 is a perspective view showing the rear portion of a bicycle with the support attached and in its operative position. Fig. 2 is an enlarged detail elevation showing the position of the attaching-link with respect to the bracket and supporting-arms when the device is in operative position. Fig. 3 is a view similar to Fig. 2 and showing the parts in their raised positions. Fig. 4 is a rear elevation of a bicycle with the support in raised position. Fig. 5 is a rear elevation of the parts shown in Fig. 3 and including additional parts of the bicycle-frame.

Referring now to the drawings, the present support includes two legs 5 and 6, which are formed from a single wire and of spring metal, so that the free ends of the legs will lie divergingly normally, the inner ends of the legs being bent inwardly to fit over the periphery of a bicycle-wheel and having a connecting bight portion 7, which is pivotally engaged in a perforation at the end of a link 8, which is in turn pivoted to the end of a bracket 9, attached to the upper portion of one of the fork sides 10 of a bicycle-frame. Upon the lower end portions of the fork sides 10 are secured collars 11, to which are pivoted links 12, and the outer ends of these links are pivotally engaged with the legs of the support.

To permit of engagement of the links 12 with the supporting-legs, said legs are bent to form horizontally or laterally extending portions 13 at points opposite to said collars, so that the upper and lower portions of each leg are laterally offset, and with these connecting portions 13 the outer ends of the links 12 are connected by engagement of the connecting portions in eyes at the ends of the links. With this construction it will be seen that if the supporting-legs be raised, as shown in Figs. 3 and 4, the links 12 will be raised at their outer ends and will act to draw the lower ends of the legs inwardly, and at the same time the link 8 will be swung upwardly into the position shown in Figs. 3 and 5, so that the bight will be carried over and beyond the pivot of the link to prevent downward movement of the legs. To limit the pivotal movement of the link in this direction, the bracket 9 is formed of a metal band which is bent around the fork side, with one end projecting beyond the other, and it is to this projecting end that the link is pivoted, the other end of the band, as shown at 15, forming a stop for the link 9.

To facilitate raising and lowering of the supporting-legs, a handle 16 is provided, and this handle is formed by bending one supporting-leg outwardly in the form of a kink and then twisting this kinked portion.

When the supporting-legs are lowered, the links 12 are swung, with the ends connected to the legs, in a downward and outward direction, and when the legs are in lowered position the links project, as shown in Fig. 1, to hold the lower ends of the legs divergingly.

In the lowered positions of the supporting-legs the link 9 is taken around, under, and beyond the pivot of the link and again rests against the stop formed by the end of the band forming the bracket 9, and active pressure of the legs has the effect of holding the legs securely against displacement.

To prevent turning of the rear wheel of the bicycle when the support is in operative position, the supporting-legs are bent adjacent to their connecting portion to engage and expand over the bicycle-tire when the support is moved into position.

What is claimed is—

1. A bicycle-support comprising an attaching-bracket for engagement with a portion of the bicycle-frame, supporting-legs formed of a single wire bent to form spaced legs and a connecting-bight and having the wire of one leg kinked to form a handle, and a link pivotally connected with the bracket and having a perforation in which the bight is pivotally engaged.

2. A bicycle-support comprising an attaching-bracket for engagement with a portion of a bicycle-frame and having a link pivoted thereto, supporting-legs formed of a single wire and including a connecting-bight pivotally engaged with the link, said legs at points between their ends having laterally-bent portions, and spreading-links pivoted to said laterally-bent portions and adapted for pivotal connection with a portion of the bicycle-frame.

In testimony that I claim the foregoing as my own I have hereto affixed my signature in the presence of two witnesses.

MELVIN H. TYLER.

Witnesses:
 RALPH W. ROSS,
 J. FRANK MANN.